United States Patent [19]

Stauter et al.

[11] B 4,013,754

[45] Mar. 22, 1977

[54] STATIC LEACHING COPPER ORE

[75] Inventors: John C. Stauter; Gerald F. Pace, both of Ponca City, Okla.

[73] Assignee: Continental Oil Company, Ponca City, Okla.

[22] Filed: June 12, 1973

[21] Appl. No.: 369,379

[44] Published under the second Trial Voluntary Protest Program on March 30, 1976 as document No. B 369,379.

[52] U.S. Cl. ............................................. 423/27
[51] Int. Cl.$^2$ ...................... C01G 3/00; C22B 3/00
[58] Field of Search ............... 423/27, 28, 29, 36, 423/38, 41; 75/118, 114, 101 R, 117

[56] References Cited

UNITED STATES PATENTS

| | | | |
|---|---|---|---|
| 650,019 | 5/1900 | Montgomerie et al. | 423/41 |
| 899,146 | 9/1908 | Turton | 75/101 R |
| 1,131,986 | 3/1915 | Benedict | 423/32 |
| 1,581,479 | 4/1926 | Van Arsdale et al. | 75/101 R |
| 3,777,003 | 10/1965 | Mitterer | 75/101 R |
| 3,801,694 | 4/1974 | Pace et al. | 75/101 R |
| 3,840,365 | 10/1974 | Hammes et al. | 75/101 R |
| 3,863,002 | 1/1975 | Pace et al. | 75/101 R |

Primary Examiner—Oscar R. Vertiz
Assistant Examiner—Brian E. Hearn
Attorney, Agent, or Firm—Richard W. Collins

[57] ABSTRACT

Copper ore is leached by static leaching methods, and the effluent pregnant leach liquor is divided into portions forming a high-concentration pregnant leach liquor and a recycleable leach liquor.

5 Claims, No Drawings

STATIC LEACHING COPPER ORE

The invention of this application relates to recovery of mineral values such as metals from source materials such as ore and scrap metal by leaching methods, especially aqueous acid leaching of even low-grade ores by static leaching methods.

Several leaching methods and techniques are known. Typical methods are illustrated in U.S. Pat. Nos. 841,983 to Just; 1,098,282 to McCoy, 2,127,240 to Stott; 2,479,930 to Herkenhoff et al; 2,686,114 to McGauley et al; 2,772,957 to Thomsen; 2,777,764 to Hedley et al; 2,797,977 to Forward et al; 2,819,145 to McCullough et al; 2,843,450 to Long; 2,894,809 to MuCullough et al; 3,126,249 to Atkin; and 3,288,569 to Henrickson et al. Typical leaching methods and methods for recovering copper and other mineral values from leach solution or pregnant leach liquor are also described in *Advances in Extractive Metallurgy* from symposium by Institution of Mining and Metallurgy published in 1968 by J. W. Arrowsmith, Ltd., Winterstroke Road, Bristol 3.

This invention provides a process for recovering mineral values, which is generally a static leaching process, preferably using an aqueous acid lixiviant or leach solution. The invention also provides a unique leach solution or pregnant liquor which has a high concentration of copper, especially when compared to other metals, such as iron or aluminum, which can be present in the source material and leach liquor.

By this invention, there is provided a process for static leaching copper mineral values from a source material selected from ore, scrap, and mixtures thereby containing copper and for producing a high copper concentration pregnant leach liquor comprising sizing said source material, contacting said source material with an acid leach solution by adding said solution to said source material and percolating said acid leach solution through said source material, adding a sweep solution to said source material to displace said acid leach solution, recovering an effluent pregnant leach liquor from said source material, and segregating the first portion of effluent pregnant leach liquor forming a concentrated pregnant leach liquor from the last portion of said effluent leach liquor forming a recycle leach liquor.

By this invention, there is also provided a high copper concentration leach solution produced by the above process. This pregnant liquor leach solution has a high copper or desired mineral value concentration, especially compared to other metals, such as iron and aluminum, which can be present in the source material and leach solution. The process produces a leach solution having a high copper concentration in a minimum leach solution volume while recovering overall substantially all, i.e., at least 75 percent, of the desired mineral value from the source material. In a preferred process for a preferred ore, the pregnant leach liquor has a concentration of at least about 7.5 gram per liter (g/l) with weight ratios of copper:iron and copper:aluminum, when present, of at least about 7:1 and at least about 4.5:1, respectively.

The process of this invention is particularly useful for a continuous or multiple vat operation because it can recover substantially all of the mineral value from the source material. In one preferred embodiment, the effluent leach liquor from one static leach vat is segregated into a first portion forming a concentrated pregnant liquor and a second portion forming a recycle leach liquor, which is used for the lixiviant or leach solution for the next static leach vat. The recycle leach liquor can be recycled through the vat from which it was recovered for higher recovery from the source material or ore in that vat. However, it is preferably used as the initial leach solution for the next vat after the lixiviant acid strength, or other additive concentration is adjusted to the desired value for optimum recovery. After leaching, the source material can be subjected to further treatment by the process of this invention or a conventional method. For the process of this invention, the first portion of leach liquor is about 10–30 volume percent (vol. percent) of the total leach solution, and the last portion is about 70–90 vol. percent. The first portion is preferably 15–25 vol. percent with the last portion being about 75–85 vol. percent.

For a multiple vat leaching operation, the concentrated leach liquor is combined into one large volume of concentrated pregnant leach liquor for subsequent mineral value recovery, such as reduction of metal values by electrowinning and chemical reduction (e.g., by hydrogen reduction or cementation of copper with iron). With a series of leaching vats, components in the recycle portion of the effluent leach liquor vary from vat to vat with a trend in the concentration of various components. This recycle technique gives optimum recovery by minimizing lixiviant or acid consumption and minimum washing steps. It also minimizes leaching from the source material and build-up of certain contaminants in the leach solution. These several functions all serve to improve efficiency by using a large portion of the lixiviant, by using the lixiviant primarily for recovery of the desired mineral value, by reducing consumption of lixiviant by undesired values, and by reducing contamination of the leach solution by these undesired mineral contaminants. Leaching can be conducted by heap leaching methods, i.e., without a containing vessel, and the leach solution is collected by a drainage system. A vat or column vessel is preferred with either upward or downward flow of leaching solution.

Lower acid consumption with the process of this invention is a function of the process. While the nature of the ore determines the minimum amount of acid required, the process of this invention requires less excess acid for leaching the desired mineral values because leach liquor high in the mineral value and low in the acid is not recycled, the portion of effluent leach liquor containing the major portion of unconsumed acid is recycled, and the contacting operation reduces consumption of acid for mineral values other than the undesired values, such as copper. Since the high concentration effluent leach liquor, i.e., the first portion, and the recycle leach liquor, i.e., last portion, are not diluted by the sweep solution, acid consumption is lower for this process than for previous processes. Composition of the leach liquor can be modified in view of this disclosure to optimize these features in view of this disclosure. The process of this invention is designed so that the first leach solution to any vat is always low in copper values (e.g., 1–5 g/l Cu) instead of as with current practices where initial leach solution may contain high copper contaminations (e.g., 20–30 g/l Cu). The use of at least 1 wt. percent acid is to insure a high copper concentration pregnant liquor.

The sweep solution used in the process of this invention serves to displace the leach solution. To avoid unnecessary dilution of the leach solution, back-mixing at the interface between leach solution and sweep solution should be held to a minimum. The sweep solution can be immiscible with the leach solution if occlusion of either solution is not a problem or uneconomical. The sweep solution is preferably water or an inexpensive aqueous solution which is compatible with the leach solution so that the recycle leach solution can be readily adjusted by adding lixiviant or a minimum amount of treatment to remove contaminants for use as a leach solution in the next leaching operation. Additives can be used, such as salts of alkali metal or alkaline earth metals and mineral acids, which include potassium, sodium, lithium, magnesium, aluminum, tin, and calcium, combined with sulfate, carbonate, halide (e.g., chloride, fluoride, bromide), phosphate, and nitrate. The sweep solution should contain less than 30 wt. percent solute and preferably less than 20 wt. percent.

Static leaching as used herein refers to contacting solid source material in a bed or body with liquid lixiviant or leaching solution, preferably aqueous solution, with the solid in a permeable bed, which is static or substantially does not move during the leaching operation. Mixing of the solid during leaching is avoided. Back-mixing or circulation of the leach solution in a direction opposite to general path of the leach solution must be substantially prevented. Back-mixing is substantially prevented in the process of this invention by sizing the source material to provide a bed of source material of substantially uniform permeability and monitoring flow rates. This prevents dead-spots where leach liquor cannot contact the solid and channeling where large portions of leach liquor by-passes and does not adequately contact portions of solid in the bed. Flow of the leaching solution can be downward, upward, or horizontal but is preferably in a manner so that the zone of initial contact of the solution and solid or the interface between liquid portions, e.g., between leach solution and sweep solution, forms a substantially flat plane and moves through the bed with substantially no back-mixing. Percolating as used herein refers to contacting the bed of ore with leach solution in a manner to produce localized contact with substantially no back-mixing. The flow rate should be sufficient to provide overall non-turbulent or quiescent flow with localized mixing for most efficient extraction of the mineral values. This flow rate should be fast enough for a reasonably short cycle time and fast enough to prevent precipitation or deposit of excessive amounts of salts within the ore bed, yet slow enough to prevent channeling or back-mixing.

For the process of this invention, the leaching solution can be any aqueous or organic liquid that removes the desired mineral values from the source material. Aqueous leach solutions containing a mineral acid to improve lixiviant properties is preferred. The solution should contain at least 1 percent by weight of at least one acid and preferably contains about 1–30 weight percent of acid. The minimum quantity and concentration depends to some extent on the nature of the ore. Acids which can be used include a halogen acid (e.g., hydrochloric, hydrofluoric, or hydrobromic), nitric acid, phosphoric acid, sulfuric, sulfureous, and fluosilicic. Other acids and additives, such as aluminum ion to improve permeability and reduce ion exchange of ions on the ore particles, can be used in the leach solution if they are compatible with the leaching operation. Organic acids, such as acetic and oxalic, can be used in certain cases. Materials such as acid halides which produce acids in solution or function as acids are considered equivalent to acids herein and can be used.

Source material which can be used for the process of this invention include any material containing copper mineral values which can be leached by the leaching solution. Such materials include scrap metal, ore, and combinations thereof. Preferred ores contain copper in the form of oxide or the soluble sulfide which readily leach under acid oxidizing conditions. Ores which can be used include aikenite, $2 PbS \cdot Cu_2 S \cdot Bi_2 S_5$; alvite; atacamite, $CuCl_2 \cdot 3 Cu(OH)_2$; azurite, $2 CuCO_3 \cdot Cu(OH)_2$; bezelianite, $Cu_2SE$; bornite, $Cu_5 FeS_4$; brochantite, $CuSO_4 \cdot 3 Cu(OH)_2$; buttgenbachite; caledonite; chalcanthite, $CuSO_4 \cdot 5 H_2O$; chalcomenite, $CuSeO_3 \cdot 24_2O$; chalcopyrite, $CuFe S_2$; chrysocolla, $CuSiO_3 \cdot 2H_2O$; covallite, $CuS$; cuprite, $Cu_2O$; cuprosklodowskite, $CuO \cdot 2 U O_3 \cdot 6 H_2O$; cuprotunaptite, $Cu WO_4$; dioptase, $CuO \cdot SiO_2$; eucairite, $Cu_2Se \cdot Ag_2Se$; gerhardite, $3 Cu(OH)_2 \cdot Cu(NO_3)_2$; germanite; johannite; laugite, $4 CuO \cdot SO_3 \cdot 4H_2O$; libethenite, $4 CuO \cdot P_2O_5 \cdot H_2O$; linarite; malachite, $CuCo_2 \cdot Cu(OH)_2$; metatorbernite; metazeunerite; olivenite; sengierite; stannite; stromeyerite; tennantite; tenorite, $CuO$; tetrahedrite; torbernite, turquois; uranochalcite; vandenbrandite; volborthite; zeunerite, and combinations thereof.

For the process of this invention, the source material is sized to provide a bed of substantially uniform permeability. For a preferred process, the source material or preferably ore can be sized when received. Sizing generally means that substantially all (or the major portion or at least 75 wt. percent (50 percent) will pass through a screen of the desired size, generally a screen having about 1 inch openings. Fines, i.e., particles below about 325-mesh Tyler screen size (i.e., those particles which will pass through a 325-mesh screen), preferably do not exceed about 10 wt. percent. For the preferred process, at least 75 wt. percent will pass through a screen with 0.375 inch openings. The source material can be crushed or screened and large fractions crushed to obtain the desired particle size distribution if necessary. Under some conditions, sizing may require no more than loading the source material into a vat for leaching.

The invention is illustrated by the following examples. Parts, percentages, ratios, and concentrations are by weight unless indicated otherwise.

EXAMPLE 1

A composite copper ore is sized to pass through a screen having ⅜ inch openings. The ore consists of oxide type minerals. The ore composite is split into nine portions of about 4,500 grams (g) each, which serve as test samples.

Each ore sample is placed in a column having an inside diameter of about 1.125 inches. The ore is supported by a stainless steel screen at the bottom of the column. Each ore sample settles to a height of about 14 feet in the column.

An acid leach solution is prepared by mixing concentrated sulfuric acid with water to produce a 5 weight percent acid solution. Each ore sample is leached with 7 liters of 5 percent acid solution by introducing the solution into the ore at the base of the column at a pressure of about 12.5 psig and allowing the solution to percolate upward through the bed of ore. Following addition of the acid leach solution, an amount of water sweep solution equal in amount to the pore volume of the ore bed is introduced into the ore at the base of the column to displace the last amount of leach solution in the ore bed.

The leach solution effluent from the ore bed is sampled after each 350 milliliters (ml) of solution providing 18–20 samples. Each solution sample is analyzed for concentration of acid, copper, iron, and aluminum.

Effluent leach solution is analyzed for copper and iron in grams per liter (g/l) using an autoanalyzer or by atomic absorption. Aluminum concentration is determined using a Perkin-Elmer atomic adsorption technique, and free acid concentration is determined by titration with 0.1 N NaOH to a pH of 2.8 using a pH meter with standard glass pH electrodes. Ore in the column was sampled at three points and analyzed by X-ray method.

The first 20 percent or 1,400 ml of effluent leach solution is segregated as pregnant liquor for subsequent recovery of the metal values. The remaining 80 percent of the leach solution is used as recycle acid leach solution after the acid concentration is adjusted to about 5 percent acid by adding concentrated sulfuric acid. About 5.6 liters of the recycle acid is used followed by 1.4 liters of fresh $H_2SO_4$ (total 7 l) to leach the next ore sample by repeating the above procedure.

EXAMPLE 2

The process of the above example was applied to nine ore samples in separate columns in a continuing leading series. Typical data are given in Tables II-X with composite data given in Table I. For these examples, the effluent leach liquor was divided at 20 vol. percent with the first 20 percent of each leaching operation forming concentrated pregnant leach liquor and the last 80 percent forming recycle leach liquor for the next column. Data for the leach liquor for each of the nine ore samples is shown in a table under the following headings: leach liquor sample number, time (minutes), cumulative volume (milliliters), sulfuric acid remaining (grams/liter), cumulative acid remaining (grams), cumulative acid consumed (pounds acid/ton of ore), copper concentration (grams/liter), cumulative copper (grams), iron concentration (grams/liter), cumulative iron (grams), copper to iron ratio, cumulative copper to iron ratio, aluminum concentration (grams/liter), cumulative aluminum (grams), copper to aluminum ratio, and cumulative copper to aluminum ratio.

TABLE I

| SAMPLE (TEST) | | | | | | INITIAL CONC | | |
|---|---|---|---|---|---|---|---|---|
| Time (Min) First Drop | From Start | Cu Rec % | Acid Consp Lbs/Ton | Ore % | Cu Sol'n g/l % | Acid (%Wt) (g/l) | Fe g/l (%) | Al Wt% |
| 1 | 5,842 | 6,585 | 77.6 | 61.7 | 0.55 | 0.0 | 5.0 | 0.0 | 0.0 |
| 2 | 5,165 | 5,585 | 75.6 | 65.0 | 0.48 | 0.62 | 6.08 | 1.07 | 0.08 |
| 3 | 5,246 | 5,706 | 80.8 | 51.3 | 0.61 | 1.20* | 5.0 | 1.93* | 0.13* |
| 4 | 6,025 | 6,580 | 77.6 | 74.5 | 0.58 | 1.61 | 5.08 | 2.24 | 0.16 |
| 5 | 4,890 | 5,179 | 75.8 | 47.4 | 0.55 | 1.71 | 5.02 | 2.45 | 0.19 |
| 6 | 4,248 | 4,518 | 76.9 | 43.0 | 0.52 | 2.02 | 5.04 | 2.60 | 0.19 |
| 7 | 3,995 | 4,200 | 69.4 | 37.3 | 0.49 | 2.02 | 5.28 | 2.36 | 0.19 |
| 8 | 4,855 | 5,320 | 74.6 | 63.6 | 0.54 | 2.15 | 5.08 | 2.14 | 0.18 |
| 9 | 4,079 | 4,784 | 76.0 | 59.2 | 0.53 | 2.38 | 5.10 | 2.45 | 0.20 |
| Ave | 3.74 Days 89.73 Hrs | | 76.0 | 55.9 | 0.57 | | 5.87 | | |

| | Cu Ore %Wt | Acid g/l (%) | FINAL CONC AVE Preg Liq g/l (%) | | | | Recycle g/l (%) | | |
|---|---|---|---|---|---|---|---|---|---|
| | | | Cu | Fe | Al | Acid | Cu | Fe | Al |
| 1 | 0.12 | 5.51 | 9.82 | 0.99 | 1.62 | 38.1 | 8.02 | 6.0 | 7.82 |
| 2 | 0.11 | 19.10 | 9.82 | 1.55 | 2.18 | 44.4 | 1.16 | 1.79 | 1.28 |
| 3 | 0.11 | 8.02 | 11.8 | 2.45 | 2.87 | 35.6 | 1.43 | 2.06 | 1.51 |
| 4 | 0.13 | 8.54 | 11.6 | 2.05 | 3.23 | 33.2 | 1.76 | 2.50 | 1.89 |
| 5 | 0.13 | 13.82 | 11.8 | 2.95 | 2.83 | 42.3 | 1.99 | 2.62 | 1.87 |
| 6 | 0.12 | 14.35 | 11.75 | 2.68 | 3.13 | 37.4 | 1.74 | 2.07 | 1.59 |
| 7 | 0.15 | 18.72 | 11.6 | 2.78 | 3.24 | 40.4 | 1.89 | 1.93 | 1.60 |
| 8 | 0.14 | 12.31 | 11.6 | 2.56 | 2.99 | 31.1 | 2.03 | 2.14 | 1.74 |
| 9 | 0.13 | 12.4 | 12.1 | 3.28 | 3.34 | 32.8 | 2.10 | 2.52 | 1.84 |
| Ave | 0.13 | 12.5 | 11.3 | 2.34 | 2.83 | | | | |

*Extrapolated

TABLE II-A

| COPPER RECYCLE TEST 1 | | | | | | | |
|---|---|---|---|---|---|---|---|
| | | | SULFURIC ACID | | | COPPER | |
| Sample No. | Time (Min) | Cum Vol (Ml) | Remaining (g/l) | Cum Rem (g) | Cum Con (Lb/Ton) | g/l Cu | Cum g Cu |
| 1 | 929 | 405.0 | 0.0 | 0.0 | 9.286 | 4.190 | 1.697 |
| 2 | 1,436 | 745.0 | 0.0 | 0.0 | 17.082 | 16.600 | 7.341 |
| 3 | 1,631 | 1,050.0 | 0.0 | 0.0 | 24.075 | 14.000 | 11.611 |
| 4 | 1,841 | 1,400.0 | 22.109 | 7.738 | 28.661 | 6.180 | 13.774 |
| 5 | 2,067 | 1,763.0 | 34.122 | 20.124 | 31.479 | 5.030 | 15.600 |
| 6 | 2,308 | 2,123.0 | 38.634 | 34.033 | 33.551 | 1.630 | 16.187 |
| 7 | 2,537 | 2,428.0 | 41.369 | 46.650 | 34.937 | 1.110 | 16.525 |
| 8 | 2,798 | 2,746.0 | 43.428 | 60.460 | 36.090 | 0.810 | 16.783 |
| 9 | 3,107 | 3,119.0 | 43.710 | 76.764 | 37.396 | 0.610 | 17.010 |
| 10 | 3,392 | 3,514.0 | 43.146 | 93.807 | 38.878 | 0.560 | 17.231 |
| 11 | 3,702 | 3,892.0 | 42.554 | 109.892 | 40.396 | 0.480 | 17.413 |

TABLE II-A-continued

COPPER RECYCLE TEST 1

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 12 | 4,092 | 4,327.0 | 42.864 | 128.538 | 42.083 | 0.410 | 17.591 |
| 13 | 4,302 | 4,557.0 | 43.202 | 138.474 | 42.940 | 0.340 | 17.669 |
| 14 | 4,625 | 4,967.0 | 44.500 | 156.719 | 44.232 | 0.330 | 17.805 |
| 15 | 4,909 | 5,437.0 | 45.402 | 178.058 | 45.525 | 0.290 | 17.941 |
| 16 | 5,218 | 5,947.0 | 48.758 | 202.925 | 46.166 | 0.230 | 18.058 |
| 17 | 5,503 | 6,407.0 | 28.341 | 215.962 | 50.919 | 0.190 | 18.146 |
| 18 | 5,842 | 6,907.0 | 3.158 | 217.541 | 61.682 | 0.068 | 18.180 |

TABLE II-B

COPPER RECYCLE TEST 1

| IRON g/l Fe | Cum g Fe | Cu/Fe | Cum Cu/Fe | ALUMINUM g/l Al | Cum g Al | Cu/Al | Cum Cu/Al |
|---|---|---|---|---|---|---|---|
| 0.650 | 0.263 | 6.446 | 6.446 | 0.103 | 0.042 | 40.680 | 40.680 |
| 1.390 | 0.736 | 11.942 | 9.976 | 0.824 | 0.322 | 20.146 | 22.807 |
| 0.660 | 0.937 | 21.212 | 12.390 | 4.017 | 1.547 | 3.458 | 7.505 |
| 1.310 | 1.396 | 4.718 | 9.869 | 2.060 | 2.268 | 3.000 | 6.073 |
| 1.020 | 1.766 | 4.931 | 8.834 | 1.339 | 2.754 | 3.757 | 5.664 |
| 0.980 | 2.119 | 1.663 | 7.640 | 1.030 | 3.125 | 1.583 | 5.180 |
| 0.670 | 2.323 | 1.657 | 7.114 | 0.824 | 3.376 | 1.347 | 4.895 |
| 0.480 | 2.476 | 1.687 | 6.779 | 0.824 | 3.638 | 0.983 | 4.613 |
| 0.350 | 2.606 | 1.743 | 6.527 | 0.721 | 3.907 | 0.846 | 4.354 |
| 0.320 | 2.733 | 1.750 | 6.306 | 0.824 | 4.233 | 0.680 | 4.071 |
| 0.270 | 2.835 | 1.778 | 6.143 | 0.824 | 4.544 | 0.583 | 3.832 |
| 0.230 | 2.935 | 1.783 | 5.994 | 0.824 | 4.903 | 0.498 | 3.588 |
| 0.180 | 2.976 | 1.889 | 5.937 | 0.824 | 5.092 | 0.413 | 3.470 |
| 0.180 | 3.050 | 1.834 | 5.888 | 0.927 | 5.472 | 0.356 | 3.254 |
| 1.350 | 3.684 | 0.215 | 4.869 | 0.927 | 5.908 | 0.313 | 3.037 |
| 1.230 | 4.312 | 0.187 | 4.188 | 0.927 | 6.381 | 0.248 | 2.830 |
| 0.590 | 4.583 | 0.322 | 3.959 | 0.412 | 6.570 | 0.461 | 2.762 |
| 0.240 | 4.703 | 0.283 | 3.865 | 0.103 | 6.622 | 0.660 | 2.745 |

TABLE III-A

COPPER RECYCLE TEST 2

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 330 | 407.0 | 0.0 | 0.0 | 10.862 | 10.100 | 4.111 |
| 2 | 548 | 697.0 | 0.0 | 0.0 | 18.602 | 17.600 | 9.215 |
| 3 | 690 | 1,014.0 | 29.046 | 9.028 | 22.970 | 8.720 | 11.979 |
| 4 | 876 | 1,409.0 | 44.923 | 26.952 | 25.626 | 4.680 | 13.828 |
| 5 | 1,064 | 1,759.0 | 49.914 | 44.422 | 27.202 | 3.030 | 14.888 |
| 6 | 1,294 | 2,139.0 | 52.114 | 64.225 | 28.543 | 2.330 | 15.773 |
| 7 | 1,500 | 2,459.0 | 52.311 | 80.965 | 29.643 | 1.980 | 16.407 |
| 8 | 1,717 | 2,789.0 | 53.072 | 98.478 | 30.666 | 1.760 | 16.988 |
| 9 | 1,950 | 3,079.0 | 53.608 | 114.025 | 31.497 | 1.570 | 17.443 |
| 10 | 2,160 | 3,339.0 | 54.426 | 128.175 | 32.146 | 1.500 | 17.833 |
| 11 | 2,460 | 3,702.0 | 55.075 | 148.168 | 32.949 | 1.370 | 18.330 |
| 12 | 2,753 | 4,097.0 | 56.569 | 170.512 | 33.560 | 1.270 | 18.832 |
| 13 | 3,055 | 4,482.0 | 58.233 | 192.932 | 33.871 | 1.210 | 19.298 |
| 14 | 3,335 | 4,832.0 | 50.450 | 210.589 | 35.364 | 0.880 | 19.606 |
| 15 | 3,630 | 5,187.0 | 46.699 | 227.168 | 37.471 | 0.650 | 19.837 |
| 16 | 3,927 | 5,545.0 | 46.812 | 243.926 | 39.577 | 0.490 | 20.012 |
| 17 | 4,228 | 5,898.0 | 45.402 | 259.953 | 41.875 | 0.450 | 20.171 |
| 18 | 4,541 | 6,254.0 | 32.430 | 271.498 | 46.245 | 0.300 | 20.278 |
| 19 | 4,827 | 6,604.0 | 10.716 | 275.249 | 53.919 | 0.140 | 20.327 |
| 20 | 5,165 | 7,059.0 | 5.358 | 277.686 | 64.979 | 0.096 | 20.370 |

TABLE III-B

COPPER RECYCLE TEST 2

| IRON g/l Fe | Cum g Fe | Cu/Fe | Cum Cu/Fe | ALUMINUM g/l Al | Cum g Al | Cu/Al | Cum Cu/Al |
|---|---|---|---|---|---|---|---|
| 1.350 | 0.549 | 7.481 | 7.481 | 0.927 | 0.377 | 10.895 | 10.895 |
| 1.260 | 0.915 | 13.968 | 10.072 | 3.914 | 1.512 | 4.497 | 6.093 |
| 1.900 | 1.517 | 4.589 | 7.896 | 2.472 | 2.296 | 3.528 | 5.217 |
| 1.720 | 2.197 | 2.721 | 6.295 | 1.957 | 3.069 | 2.391 | 4.506 |
| 1.630 | 2.767 | 1.859 | 5.380 | 1.648 | 3.646 | 1.839 | 4.084 |
| 2.000 | 3.527 | 1.165 | 4.472 | 1.545 | 4.233 | 1.508 | 3.726 |
| 1.970 | 4.157 | 1.005 | 3.946 | 1.545 | 4.727 | 1.282 | 3.471 |
| 2.250 | 4.900 | 0.782 | 3.467 | 1.648 | 5.271 | 1.068 | 3.223 |
| 2.380 | 5.590 | 0.660 | 3.120 | 1.648 | 5.749 | 0.953 | 3.034 |
| 2.270 | 6.180 | 0.661 | 2.885 | 1.648 | 6.178 | 0.910 | 2.887 |
| 2.270 | 7.004 | 0.604 | 2.617 | 1.751 | 6.813 | 0.782 | 2.690 |
| 2.580 | 8.023 | 0.492 | 2.347 | 1.751 | 7.505 | 0.725 | 2.509 |
| 2.550 | 9.005 | 0.475 | 2.143 | 1.854 | 8.219 | 0.653 | 2.348 |

TABLE III-B-continued

COPPER RECYCLE TEST 2

| | IRON | | | | ALUMINUM | | |
|---|---|---|---|---|---|---|---|
| g/l Fe | Cum g Fe | Cu/Fe | Cum Cu/Fe | g/l Al | Cum g Al | Cu/Al | Cum Cu/Al |
| 1.960 | 9.691 | 0.449 | 2.023 | 1.339 | 8.687 | 0.657 | 2.257 |
| 1.720 | 10.302 | 0.378 | 1.926 | 1.133 | 9.089 | 0.574 | 2.182 |
| 1.580 | 10.867 | 0.310 | 1.841 | 1.030 | 9.458 | 0.476 | 2.116 |
| 1.660 | 11.453 | 0.271 | 1.761 | 1.133 | 9.858 | 0.397 | 2.046 |
| 1.260 | 11.902 | 0.238 | 1.704 | 0.721 | 10.115 | 0.416 | 2.005 |
| 0.620 | 12.119 | 0.226 | 1.677 | 0.309 | 10.223 | 0.453 | 1.988 |
| 0.430 | 12.315 | 0.223 | 1.654 | 0.206 | 10.317 | 0.466 | 1.975 |

TABLE IV-A

COPPER RECYCLE TEST 3

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 300 | 350.0 | 0.0 | 0.0 | 8.025 | 9.490 | 3.321 |
| 2 | 640 | 703.0 | 0.0 | 0.0 | 16.119 | 19.530 | 10.216 |
| 3 | 889 | 1,258.0 | 20.304 | 11.269 | 23.836 | 10.110 | 15.827 |
| 4 | 963 | 1,402.0 | 37.027 | 16.601 | 24.768 | 4.940 | 16.538 |
| 5 | 1,180 | 1,764.0 | 40.467 | 31.250 | 26.557 | 3.840 | 17.928 |
| 6 | 1,391 | 2,114.0 | 44.415 | 46.795 | 27.673 | 2.940 | 18.957 |
| 7 | 1,600 | 2,464.0 | 44.133 | 62.241 | 28.833 | 2.560 | 19.853 |
| 8 | 1,846 | 2,814.0 | 43.428 | 77.441 | 30.102 | 2.450 | 20.711 |
| 9 | 2,118 | 3,164.0 | 43.569 | 92.690 | 31.350 | 2.220 | 21.488 |
| 10 | 2,393 | 3,514.0 | 43.851 | 108.038 | 32.553 | 2.090 | 22.219 |
| 11 | 2,695 | 3,889.0 | 44.838 | 124.852 | 33.679 | 2.070 | 22.995 |
| 12 | 2,973 | 4,239.0 | 45.966 | 140.940 | 34.553 | 1.920 | 23.667 |
| 13 | 3,331 | 4,589.0 | 49.773 | 158.361 | 34.836 | 1.850 | 24.315 |
| 14 | 3,669 | 4,923.0 | 52.452 | 175.880 | 34.708 | 1.790 | 24.913 |
| 15 | 4,028 | 5,283.0 | 46.812 | 192.732 | 35.472 | 1.200 | 26.345 |
| 16 | 4,286 | 5,633.0 | 42.864 | 207.735 | 36.829 | 0.680 | 25.583 |
| 17 | 4,552 | 5,983.0 | 42.441 | 222.589 | 38.252 | 0.470 | 25.747 |
| 18 | 4,816 | 6,351.0 | 42.018 | 238.052 | 39.817 | 0.380 | 25.887 |
| 19 | 5,056 | 6,706.0 | 19.035 | 244.809 | 44.954 | 0.180 | 25.951 |
| 20 | 5,246 | 7,000.0 | 3.102 | 245.721 | 51.289 | 0.086 | 25.976 |

TABLE IV-B

COPPER RECYCLE TEST 3

| | IRON | | | | ALUMINUM | | |
|---|---|---|---|---|---|---|---|
| g/l Fe | Cum g Fe | Cu/Fe | Cum Cu/Fe | g/l Al | Cum g Al | Cu/Al | Cum Cu/Al |
| 2.070 | 0.724 | 4.585 | 4.585 | 0.412 | 0.144 | 23.034 | 23.034 |
| 2.290 | 1.533 | 8.528 | 6.664 | 4.429 | 1.708 | 4.410 | 5.982 |
| 2.760 | 3.065 | 3.663 | 5.164 | 3.502 | 3.651 | 2.887 | 4.335 |
| 2.570 | 3.435 | 1.922 | 4.815 | 2.575 | 4.022 | 1.918 | 4.112 |
| 2.500 | 4.340 | 1.536 | 4.131 | 2.369 | 4.880 | 1.621 | 3.674 |
| 2.710 | 5.288 | 1.085 | 3.585 | 2.060 | 5.601 | 1.427 | 3.385 |
| 2.850 | 6.286 | 0.898 | 3.158 | 2.163 | 6.358 | 1.184 | 3.123 |
| 3.000 | 7.336 | 0.817 | 2.823 | 2.266 | 7.151 | 1.081 | 2.896 |
| 3.270 | 8.480 | 0.679 | 2.534 | 2.369 | 7.980 | 0.937 | 2.693 |
| 3.210 | 9.604 | 0.651 | 2.314 | 2.369 | 8.809 | 0.882 | 2.522 |
| 3.260 | 10.826 | 0.635 | 2.124 | 2.266 | 9.659 | 0.914 | 2.381 |
| 3.490 | 12.048 | 0.550 | 1.964 | 2.472 | 10.524 | 0.777 | 2.249 |
| 3.150 | 13.150 | 0.587 | 1.849 | 2.369 | 11.353 | 0.781 | 2.142 |
| 3.030 | 14.162 | 0.591 | 1.759 | 2.369 | 12.144 | 0.756 | 2.051 |
| 2.160 | 14.940 | 0.556 | 1.696 | 1.648 | 12.738 | 0.728 | 1.990 |
| 1.670 | 15.524 | 0.407 | 1.648 | 1.133 | 13.134 | 0.600 | 1.948 |
| 1.610 | 16.088 | 0.292 | 1.600 | 1.030 | 13.495 | 0.456 | 1.908 |
| 1.620 | 16.684 | 0.235 | 1.552 | 0.927 | 13.836 | 0.410 | 1.871 |
| 0.760 | 16.954 | 0.237 | 1.531 | 0.412 | 13.982 | 0.437 | 1.856 |
| 0.350 | 17.057 | 0.246 | 1.523 | 0.103 | 14.012 | 0.835 | 1.854 |

TABLE V-A

COPPER RECYCLE TEST 4

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 515 | 380.0 | 0.0 | 0.0 | 8.817 | 11.864 | 4.508 |
| 2 | 929 | 730.0 | 0.0 | 0.0 | 16.939 | 18.538 | 10.997 |
| 3 | 1,129 | 1,080.0 | 8.460 | 2.961 | 23.744 | 10.593 | 14.704 |
| 4 | 1,260 | 1,410.0 | 27.777 | 12.127 | 27.327 | 4.936 | 16.333 |
| 5 | 1,421 | 1,760.0 | 35.250 | 24.465 | 29.965 | 3.443 | 17.538 |
| 6 | 1,603 | 2,110.0 | 37.647 | 37.641 | 32.230 | 2.797 | 18.517 |
| 7 | 1,803 | 2,481.0 | 39.198 | 52.184 | 34.375 | 2.595 | 19.480 |
| 8 | 2,035 | 2,801.0 | 38.211 | 64.411 | 36.366 | 2.542 | 20.293 |
| 9 | 2,511 | 3,151.0 | 38.070 | 77.736 | 38.565 | 2.521 | 21.176 |
| 10 | 2,819 | 3,503.0 | 38.775 | 91.385 | 40.667 | 2.362 | 22.007 |
| 11 | 3,249 | 3,878.0 | 45.402 | 108.410 | 41.801 | 2.362 | 22.893 |
| 12 | 4,011 | 4,228.0 | 45.684 | 124.400 | 42.816 | 2.468 | 23.756 |

TABLE V-A-continued

COPPER RECYCLE TEST 4

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 13 | 4,696 | 4,578.0 | 42.300 | 139.205 | 44.357 | 2.553 | 24.650 |
| 14 | 5,320 | 5,623.0 | 41.877 | 182.966 | 49.155 | 1.356 | 26.067 |
| 15 | 5,495 | 5,985.0 | 29.610 | 193.685 | 52.791 | 0.233 | 26.151 |
| 16 | 5,691 | 6,357.0 | 8.460 | 196.832 | 60.024 | 0.090 | 26.185 |
| 17 | 5,871 | 6,707.0 | 2.115 | 197.572 | 67.816 | 0.064 | 26.207 |
| 18 | 6,025 | 7,001.0 | 1.410 | 197.987 | 74.454 | 0.053 | 26.223 |

TABLE V-B

COPPER RECYCLE TEST 4

| IRON g/l Fe | Cum g Fe | Cu/Fe | Cum Cu/Fe | ALUMINUM g/l Al | Cum g Al | Cu/Al | Cum Cu/Al |
|---|---|---|---|---|---|---|---|
| 1.227 | 0.466 | 9.669 | 9.669 | 1.133 | 0.431 | 10.471 | 10.471 |
| 1.537 | 1.004 | 12.061 | 10.951 | 4.738 | 2.089 | 3.913 | 5.264 |
| 2.305 | 1.811 | 4.596 | 8.120 | 4.223 | 3.567 | 2.508 | 4.122 |
| 3.296 | 2.899 | 1.498 | 5.635 | 2.987 | 4.553 | 1.652 | 3.588 |
| 2.974 | 3.940 | 1.158 | 4.452 | 2.472 | 5.418 | 1.393 | 3.237 |
| 2.825 | 4.928 | 0.990 | 3.757 | 2.266 | 6.211 | 1.234 | 2.981 |
| 2.949 | 6.022 | 0.880 | 3.235 | 2.472 | 7.128 | 1.050 | 2.733 |
| 3.154 | 7.032 | 0.806 | 2.886 | 2.575 | 7.952 | 0.987 | 2.552 |
| 3.228 | 8.161 | 0.781 | 2.595 | 2.575 | 8.853 | 0.979 | 2.392 |
| 3.222 | 9.296 | 0.733 | 2.367 | 2.575 | 9.760 | 0.917 | 2.255 |
| 3.389 | 10.566 | 0.697 | 2.167 | 2.472 | 10.687 | 0.956 | 2.142 |
| 3.779 | 11.889 | 0.653 | 1.998 | 2.781 | 11.660 | 0.887 | 2.037 |
| 4.281 | 13.387 | 0.596 | 1.841 | 3.193 | 12.778 | 0.800 | 1.929 |
| 2.770 | 16.282 | 0.490 | 1.601 | 1.957 | 14.823 | 0.693 | 1.759 |
| 0.877 | 16.600 | 0.266 | 1.575 | 0.515 | 15.009 | 0.452 | 1.742 |
| 0.341 | 16.726 | 0.264 | 1.565 | 0.206 | 15.086 | 0.437 | 1.736 |
| 0.251 | 16.814 | 0.255 | 1.559 | 0.103 | 15.122 | 0.621 | 1.733 |
| 0.248 | 16.887 | 0.214 | 1.553 | 0.103 | 15.152 | 0.515 | 1.731 |

TABLE VI-A

COPPER RECYCLE TEST 5

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 321 | 350.0 | 0.0 | 0.0 | 8.057 | 13.130 | 4.595 |
| 2 | 624 | 650.0 | 0.0 | 0.0 | 14.963 | 19.800 | 10.535 |
| 3 | 854 | 1,037.0 | 22.278 | 8.622 | 20.040 | 9.720 | 14.297 |
| 4 | 1,009 | 1,400.0 | 29.610 | 19.370 | 23.619 | 6.090 | 16.508 |
| 5 | 1,180 | 1,755.0 | 42.018 | 34.286 | 25.162 | 3.690 | 17.818 |
| 6 | 1,379 | 2,105.0 | 44.838 | 49.980 | 26.244 | 3.050 | 18.885 |
| 7 | 1,596 | 2,450.0 | 45.684 | 65.741 | 27.181 | 2.970 | 19.910 |
| 8 | 1,834 | 2,824.0 | 44.838 | 82.510 | 28.338 | 2.860 | 20.979 |
| 9 | 2,074 | 3,174.0 | 43.146 | 97.611 | 29.683 | 2.860 | 21.980 |
| 10 | 2,329 | 3,500.0 | 42.582 | 111.493 | 31.018 | 2.840 | 22.906 |
| 11 | 2,644 | 3,895.0 | 42.582 | 128.313 | 32.635 | 2.580 | 23.925 |
| 12 | 2,844 | 4,245.0 | 46.248 | 144.499 | 33.498 | 2.540 | 24.814 |
| 13 | 3,093 | 4,595.0 | 47.940 | 161.278 | 34.098 | 2.500 | 25.689 |
| 14 | 3,330 | 4,945.0 | 52.170 | 179.538 | 34.040 | 2.390 | 26.526 |
| 15 | 3,586 | 5,295.0 | 46.812 | 195.922 | 34.815 | 1.450 | 27.033 |
| 16 | 3,798 | 5,645.0 | 43.992 | 211.319 | 36.029 | 0.750 | 27.296 |
| 17 | 4,072 | 5,995.0 | 45.966 | 277.407 | 36.936 | 0.440 | 27.450 |
| 18 | 4,372 | 6,355.0 | 47.376 | 244.463 | 37.643 | 0.320 | 27.565 |
| 19 | 4,652 | 6,705.0 | 27.495 | 254.086 | 41.423 | 0.170 | 27.625 |
| 20 | 4,890 | 7,000.0 | 6.063 | 255.875 | 47.419 | 0.070 | 27.645 |

TABLE VI-B

COPPER RECYCLE TEST 5

| IRON g/l Fe | Cum g Fe | Cu/Fe | Cum Cu/Fe | ALUMINUM g/l Al | Cum g Al | Cu/Al | Cum Cu/Al |
|---|---|---|---|---|---|---|---|
| 2.310 | 0.808 | 5.684 | 5.684 | 1.401 | 0.490 | 9.373 | 9.373 |
| 1.970 | 1.399 | 10.051 | 7.528 | 4.223 | 1.757 | 4.689 | 5.996 |
| 4.210 | 3.029 | 2.309 | 4.720 | 3.193 | 2.993 | 3.044 | 4.777 |
| 3.050 | 4.136 | 1.997 | 3.991 | 2.678 | 3.965 | 2.274 | 4.163 |
| 2.930 | 5.176 | 1.259 | 3.442 | 2.369 | 4.806 | 1.558 | 3.707 |
| 2.900 | 6.191 | 1.052 | 3.050 | 2.266 | 5.599 | 1.346 | 3.373 |
| 3.130 | 7.271 | 0.949 | 2.738 | 2.266 | 6.381 | 1.311 | 3.120 |
| 3.300 | 8.505 | 0.867 | 2.467 | 2.472 | 7.305 | 1.157 | 2.872 |
| 3.570 | 9.755 | 0.801 | 2.253 | 2.575 | 8.207 | 1.111 | 2.678 |
| 3.710 | 10.964 | 0.765 | 2.089 | 2.575 | 9.046 | 1.103 | 2.532 |
| 3.740 | 12.441 | 0.690 | 1.923 | 2.678 | 10.104 | 0.963 | 2.368 |
| 3.820 | 13.778 | 0.665 | 1.801 | 2.575 | 11.005 | 0.986 | 2.255 |
| 3.850 | 15.126 | 0.649 | 1.698 | 2.678 | 11.942 | 0.934 | 2.151 |
| 3.720 | 16.428 | 0.642 | 1.615 | 2.472 | 12.808 | 0.967 | 2.071 |
| 2.380 | 17.261 | 0.608 | 1.666 | 1.648 | 13.384 | 0.880 | 2.020 |

TABLE VI-B-continued

COPPER RECYCLE TEST 5

| IRON | | | | ALUMINUM | | | |
|---|---|---|---|---|---|---|---|
| g/l Fe | Cum g Fe | Cu/Fe | Cum Cu/Fe | g/l Al | Cum g Al | Cu/Al | Cum Cu/Al |
| 1.450 | 17.768 | 0.517 | 1.536 | 1.030 | 13.745 | 0.728 | 1.986 |
| 1.100 | 18.153 | 0.400 | 1.512 | 0.824 | 14.033 | 0.534 | 1.956 |
| 1.000 | 18.513 | 0.320 | 1.489 | 0.721 | 14.293 | 0.444 | 1.929 |
| 0.590 | 18.720 | 0.288 | 1.476 | 0.309 | 14.401 | 0.550 | 1.918 |
| 0.270 | 18.799 | 0.259 | 1.471 | 0.103 | 14.431 | 0.680 | 1.916 |

TABLE VII-A

COPPER RECYCLE TEST 6

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 313 | 350.0 | 0.0 | 0.0 | 8.073 | 11.910 | 4.168 |
| 2 | 608 | 715.0 | 0.0 | 0.0 | 16.492 | 18.340 | 10.863 |
| 3 | 840 | 1,143.0 | 23.970 | 10.259 | 21.805 | 9.740 | 15.031 |
| 4 | 952 | 1,400.0 | 38.408 | 20.130 | 23.346 | 5.700 | 16.496 |
| 5 | 1,125 | 1,750.0 | 42.864 | 35.132 | 24.751 | 4.280 | 17.994 |
| 6 | 1,304 | 2,100.0 | 46.530 | 51.418 | 25.586 | 3.380 | 19.177 |
| 7 | 1,511 | 2,450.0 | 48.504 | 68.394 | 26.114 | 3.090 | 20.259 |
| 8 | 1,741 | 2,800.0 | 48.363 | 85.321 | 26.664 | 2.900 | 21.274 |
| 9 | 2,006 | 3,150.0 | 48.786 | 102.396 | 27.148 | 2.910 | 22.292 |
| 10 | 2,320 | 3,500.0 | 48.786 | 119.472 | 27.632 | 2.760 | 23.258 |
| 11 | 2,645 | 3,850.0 | 50.252 | 137.060 | 27.888 | 2.740 | 24.217 |
| 12 | 2,887 | 4,200.0 | 51.042 | 154.925 | 28.022 | 2.580 | 25.120 |
| 13 | 3,108 | 4,550.0 | 52.170 | 173.184 | 27.979 | 2.620 | 26.037 |
| 14 | 3,329 | 4,900.0 | 51.183 | 191.098 | 28.091 | 2.410 | 26.881 |
| 15 | 3,555 | 5,250.0 | 46.812 | 207.482 | 28.882 | 1.480 | 27.399 |
| 16 | 3,724 | 5,600.0 | 44.274 | 222.978 | 30.068 | 0.740 | 27.658 |
| 17 | 3,848 | 5,950.0 | 47.658 | 239.658 | 30.728 | 0.480 | 27.826 |
| 18 | 3,997 | 6,356.0 | 47.376 | 258.893 | 31.544 | 0.260 | 27.931 |
| 19 | 4,138 | 6,706.0 | 18.048 | 265.209 | 36.809 | 0.100 | 27.966 |
| 20 | 4,248 | 7,006.0 | 5.922 | 266.986 | 42.939 | 0.040 | 27.978 |

TABLE VII-B

COPPER RECYCLE TEST 6

| IRON | | | | ALUMINUM | | | |
|---|---|---|---|---|---|---|---|
| g/l Fe | Cum g Fe | Cu/Fe | Cum Cu/Fe | g/l Al | Cum g Al | Cu/Al | Cum Cu/Al |
| 1.930 | 0.675 | 6.171 | 6.171 | 1.339 | 0.469 | 8.895 | 8.895 |
| 2.260 | 1.500 | 8.115 | 7.240 | 4.532 | 2.123 | 4.047 | 5.117 |
| 3.430 | 2.968 | 2.840 | 5.064 | 3.605 | 3.666 | 2.702 | 4.100 |
| 3.040 | 3.750 | 1.875 | 4.399 | 2.781 | 4.380 | 2.050 | 3.766 |
| 2.970 | 4.789 | 1.441 | 3.757 | 2.575 | 5.282 | 1.662 | 3.407 |
| 2.910 | 5.808 | 1.162 | 3.302 | 2.369 | 6.111 | 1.427 | 3.138 |
| 3.100 | 6.893 | 0.997 | 2.939 | 2.472 | 6.976 | 1.250 | 2.904 |
| 3.180 | 8.006 | 0.912 | 2.657 | 2.472 | 7.841 | 1.173 | 2.713 |
| 3.370 | 9.185 | 0.864 | 2.427 | 2.472 | 8.706 | 1.177 | 2.560 |
| 3.440 | 10.389 | 0.802 | 2.239 | 2.575 | 9.608 | 1.072 | 2.421 |
| 3.590 | 11.646 | 0.763 | 2.079 | 2.575 | 10.509 | 1.064 | 2.304 |
| 3.500 | 12.871 | 0.737 | 1.952 | 2.781 | 11.482 | 0.928 | 2.188 |
| 3.660 | 14.152 | 0.716 | 1.840 | 2.781 | 12.456 | 0.942 | 2.090 |
| 3.490 | 15.373 | 0.691 | 1.749 | 2.678 | 13.393 | 0.900 | 2.007 |
| 2.260 | 16.164 | 0.655 | 1.695 | 1.648 | 13.970 | 0.898 | 1.961 |
| 1.350 | 16.637 | 0.548 | 1.662 | 0.927 | 14.294 | 0.798 | 1.935 |
| 0.990 | 16.983 | 0.485 | 1.638 | 0.721 | 14.547 | 0.666 | 1.913 |
| 0.730 | 17.280 | 0.356 | 1.616 | 0.515 | 14.756 | 0.505 | 1.893 |
| 0.270 | 17.374 | 0.370 | 1.610 | 0.206 | 14.828 | 0.485 | 1.886 |
| 0.170 | 17.425 | 0.235 | 1.606 | 0.103 | 14.859 | 0.388 | 1.888 |

TABLE VIII-A

COPPER RECYCLE TEST 7

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 328 | 350.0 | 0.0 | 0.0 | 8.378 | 14.440 | 5.054 |
| 2 | 561 | 700.0 | 1.410 | 0.493 | 16.537 | 17.070 | 11.028 |
| 3 | 696 | 1,050.0 | 31.584 | 11.548 | 20.002 | 8.820 | 14.115 |
| 4 | 820 | 1,400.0 | 41.877 | 26.205 | 21.866 | 5.970 | 16.205 |
| 5 | 978 | 1,750.0 | 47.094 | 42.688 | 22.918 | 4.810 | 17.888 |
| 6 | 1,153 | 2,100.0 | 50.196 | 60.256 | 23.488 | 4.030 | 19.299 |
| 7 | 1,389 | 2,450.0 | 51.888 | 78.417 | 23.794 | 3.530 | 20.534 |
| 8 | 1,615 | 2,800.0 | 51.324 | 96.380 | 24.188 | 3.230 | 21.665 |
| 9 | 1,884 | 3,150.0 | 51.888 | 114.541 | 24.495 | 3.000 | 22.715 |
| 10 | 2,269 | 3,500.0 | 53.580 | 133.294 | 24.538 | 2.950 | 23.747 |
| 11 | 2,505 | 3,850.0 | 53.580 | 152.047 | 24.582 | 2.870 | 24.752 |
| 12 | 2,688 | 4,200.0 | 55.836 | 171.590 | 24.274 | 2.780 | 25.725 |
| 13 | 2,851 | 4,550.0 | 58.656 | 192.119 | 23.528 | 2.750 | 26.687 |
| 14 | 3,035 | 4,960.0 | 56.682 | 215.359 | 23.014 | 2.230 | 27.602 |

TABLE VIII-A-continued

COPPER RECYCLE TEST 7

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 15 | 3,181 | 5,315.0 | 49.914 | 233.078 | 23.636 | 1.220 | 28.035 |
| 16 | 3,357 | 5,665.0 | 48.504 | 250.055 | 24.469 | 0.690 | 28.276 |
| 17 | 3,546 | 6,026.0 | 50.760 | 268.379 | 24.966 | 0.460 | 28.442 |
| 18 | 3,713 | 6,386.0 | 44.556 | 284.419 | 26.455 | 0.300 | 28.550 |
| 19 | 3,886 | 6,765.0 | 19.176 | 291.687 | 32.297 | 0.160 | 28.611 |
| 20 | 3,995 | 7,000.0 | 5.640 | 293.012 | 37.333 | 0.100 | 28.634 |

TABLE VIII-B

COPPER RECYCLE TEST 7

| IRON g/l Fe | Cum g Fe | Cu/Fe | Cum Cu/Fe | ALUMINUM g/l Al | Cum g Al | Cu/Al | Cum Cu/Al |
|---|---|---|---|---|---|---|---|
| 1.660 | 0.581 | 8.699 | 8.699 | 1.957 | 0.685 | 7.379 | 7.379 |
| 3.400 | 1.771 | 5.021 | 6.227 | 4.635 | 2.307 | 3.683 | 4.780 |
| 3.100 | 2.856 | 2.845 | 4.942 | 3.399 | 3.497 | 2.595 | 4.037 |
| 2.980 | 3.899 | 2.003 | 4.156 | 2.987 | 4.542 | 1.999 | 3.568 |
| 3.010 | 4.952 | 1.598 | 3.612 | 2.781 | 5.516 | 1.730 | 3.243 |
| 2.980 | 5.995 | 1.352 | 3.219 | 2.575 | 6.417 | 1.565 | 3.008 |
| 2.980 | 7.038 | 1.185 | 2.917 | 2.575 | 7.318 | 1.371 | 2.806 |
| 3.060 | 8.109 | 1.056 | 2.672 | 2.678 | 8.255 | 1.206 | 2.624 |
| 3.090 | 9.191 | 0.971 | 2.471 | 2.884 | 9.265 | 1.040 | 2.452 |
| 3.240 | 10.325 | 0.910 | 2.300 | 2.781 | 10.238 | 1.061 | 2.319 |
| 3.350 | 11.497 | 0.857 | 2.153 | 2.575 | 11.139 | 1.115 | 2.222 |
| 3.440 | 12.701 | 0.808 | 2.025 | 2.678 | 12.077 | 1.038 | 2.130 |
| 3.410 | 13.895 | 0.806 | 1.921 | 2.575 | 12.978 | 1.068 | 2.056 |
| 2.790 | 15.039 | 0.799 | 1.835 | 2.163 | 13.865 | 1.031 | 1.991 |
| 1.610 | 15.610 | 0.758 | 1.796 | 1.236 | 14.304 | 0.987 | 1.960 |
| 1.020 | 15.967 | 0.676 | 1.771 | 0.824 | 14.592 | 0.837 | 1.938 |
| 0.780 | 16.249 | 0.590 | 1.750 | 0.618 | 14.815 | 0.744 | 1.920 |
| 0.600 | 16.465 | 0.500 | 1.734 | 0.515 | 15.000 | 0.583 | 1.903 |
| 0.350 | 16.598 | 0.457 | 1.724 | 0.206 | 15.079 | 0.777 | 1.897 |
| 0.220 | 16.649 | 0.455 | 1.720 | 0.103 | 15.103 | 0.971 | 1.896 |

TABLE IX-A

COPPER RECYCLE TEST 8

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 291 | 397.0 | 0.0 | 0.0 | 9.212 | 11.640 | 4.621 |
| 2 | 471 | 747.0 | 0.0 | 0.0 | 17.333 | 17.080 | 10.599 |
| 3 | 638 | 1,050.0 | 19.740 | 5.981 | 21.705 | 10.580 | 13.805 |
| 4 | 829 | 1,400.0 | 32.148 | 17.233 | 24.826 | 6.870 | 16.209 |
| 5 | 1,073 | 1,750.0 | 31.584 | 28.287 | 28.034 | 5.070 | 17.984 |
| 6 | 1,311 | 2,105.0 | 37.224 | 41.502 | 30.398 | 4.020 | 19.411 |
| 7 | 1,551 | 2,455.0 | 37.788 | 54.728 | 32.641 | 3.480 | 20.629 |
| 8 | 1,822 | 2,805.0 | 37.224 | 67.756 | 34.972 | 3.330 | 21.794 |
| 9 | 2,122 | 3,155.0 | 37.365 | 80.834 | 37.281 | 3.090 | 22.876 |
| 10 | 2,433 | 3,505.0 | 37.224 | 93.862 | 39.612 | 2.910 | 23.894 |
| 11 | 2,745 | 3,855.0 | 37.929 | 107.137 | 41.833 | 2.910 | 24.913 |
| 12 | 3,028 | 4,205.0 | 37.224 | 120.166 | 44.164 | 2.810 | 25.896 |
| 13 | 3,283 | 4,555.0 | 37.506 | 133.293 | 46.451 | 2.730 | 26.852 |
| 14 | 3,526 | 4,905.0 | 36.942 | 146.222 | 48.826 | 2.670 | 27.786 |
| 15 | 3,777 | 5,255.0 | 36.942 | 159.152 | 51.200 | 2.320 | 28.598 |
| 16 | 4,028 | 5,623.0 | 38.634 | 173.369 | 53.420 | 1.260 | 29.062 |
| 17 | 4,229 | 5,950.0 | 40.608 | 186.648 | 55.106 | 0.630 | 29.268 |
| 18 | 4,443 | 6,300.0 | 42.159 | 201.404 | 56.669 | 0.400 | 29.408 |
| 19 | 4,722 | 6,773.0 | 37.506 | 219.144 | 59.760 | 0.320 | 29.559 |
| 20 | 4,855 | 7,000.0 | 13.818 | 222.281 | 63.633 | 0.160 | 29.596 |

TABLE IX-B

COPPER RECYCLE TEST 8

| IRON g/l Fe | Cum g Fe | Cu/Fe | Cum Cu/Fe | ALUMINUM g/l Al | Cum g Al | Cu/Al | Cum Cu/Al |
|---|---|---|---|---|---|---|---|
| 1.950 | 0.774 | 5.969 | 5.969 | 1.442 | 0.572 | 8.072 | 8.072 |
| 2.610 | 1.688 | 6.544 | 6.280 | 4.429 | 2.123 | 3.856 | 4.993 |
| 2.980 | 2.591 | 3.550 | 5.329 | 3.502 | 3.184 | 3.021 | 4.336 |
| 2.830 | 3.581 | 2.428 | 4.256 | 2.884 | 4.193 | 2.382 | 3.866 |
| 2.740 | 4.540 | 1.850 | 3.961 | 2.575 | 5.094 | 1.969 | 3.530 |
| 2.720 | 5.506 | 1.478 | 3.526 | 2.575 | 6.009 | 1.561 | 3.231 |
| 2.770 | 6.475 | 1.256 | 3.186 | 2.472 | 6.874 | 1.408 | 3.001 |
| 3.020 | 7.532 | 1.103 | 2.893 | 2.575 | 7.775 | 1.293 | 2.803 |
| 3.080 | 8.610 | 1.003 | 2.657 | 2.575 | 8.676 | 1.200 | 2.637 |
| 3.060 | 9.681 | 0.951 | 2.463 | 2.575 | 9.577 | 1.130 | 2.495 |
| 3.230 | 10.812 | 0.901 | 2.304 | 2.575 | 10.479 | 1.130 | 2.377 |
| 3.360 | 11.988 | 0.836 | 2.160 | 2.678 | 11.416 | 1.049 | 2.268 |
| 3.450 | 13.195 | 0.791 | 2.035 | 2.575 | 12.317 | 1.060 | 2.180 |

TABLE IX-B-continued

COPPER RECYCLE TEST 8

| | IRON | | | | ALUMINUM | | |
|---|---|---|---|---|---|---|---|
| g/l Fe | Cum g Fe | Cu/Fe | Cum Cu/Fe | g/l Al | Cum g Al | Cu/Al | Cum Cu/Al |
| 3.440 | 14.399 | 0.776 | 1.930 | 2.575 | 13.218 | 1.037 | 2.102 |
| 3.040 | 15.463 | 0.763 | 1.849 | 2.369 | 14.048 | 0.979 | 2.036 |
| 1.860 | 16.148 | 0.677 | 1.800 | 1.442 | 14.578 | 0.874 | 1.994 |
| 1.260 | 16.560 | 0.500 | 1.767 | 1.030 | 14.915 | 0.612 | 1.962 |
| 1.180 | 16.973 | 0.339 | 1.733 | 0.824 | 15.204 | 0.485 | 1.934 |
| 1.230 | 17.554 | 0.260 | 1.684 | 0.824 | 15.593 | 0.388 | 1.896 |
| 0.660 | 17.704 | 0.242 | 1.672 | 0.309 | 15.663 | 0.518 | 1.889 |

TABLE X-A

COPPER RECYCLE TEST 9

| Sample No. | Time (Min) | Cum Vol (Ml) | SULFURIC ACID Remaining (g/l) | Cum Rem (g) | Cum Con (Lb/Ton) | COPPER g/l Cu | Cum g Cu |
|---|---|---|---|---|---|---|---|
| 1 | 715 | 425.0 | 0.0 | 0.0 | 9.900 | 12.600 | 5.355 |
| 2 | 844 | 700.0 | 0.0 | 0.0 | 16.307 | 18.700 | 10.497 |
| 3 | 981 | 1,050.0 | 15.792 | 5.527 | 22.003 | 11.300 | 14.627 |
| 4 | 1,118 | 1,400.0 | 33.840 | 17.371 | 24.893 | 6.610 | 16.941 |
| 5 | 1,261 | 1,750.0 | 38.352 | 30.794 | 27.080 | 5.020 | 18.698 |
| 6 | 1,415 | 2,100.0 | 40.185 | 44.859 | 28.983 | 4.070 | 20.122 |
| 7 | 1,580 | 2,450.0 | 41.313 | 59.319 | 30.709 | 3.420 | 21.319 |
| 8 | 1,758 | 2,800.0 | 41.313 | 73.778 | 32.436 | 3.250 | 22.457 |
| 9 | 1,936 | 3,150.0 | 41.313 | 88.238 | 34.163 | 3.180 | 23.570 |
| 10 | 2,142 | 3,500.0 | 42.018 | 102.944 | 35.780 | 2.930 | 24.595 |
| 11 | 2,335 | 3,850.0 | 37.788 | 116.170 | 38.056 | 2.810 | 25.579 |
| 12 | 2,540 | 4,214.0 | 42.300 | 131.567 | 39.692 | 2.870 | 26.624 |
| 13 | 2,700 | 4,550.0 | 41.172 | 145.401 | 41.371 | 2.800 | 27.564 |
| 14 | 2,870 | 4,900.0 | 38.634 | 158.923 | 43.514 | 2.760 | 28.530 |
| 15 | 3,046 | 5,250.0 | 37.506 | 172.050 | 45.833 | 2.710 | 29.479 |
| 16 | 3,233 | 5,600.0 | 35.673 | 184.534 | 48.438 | 1.800 | 30.109 |
| 17 | 3,439 | 5,950.0 | 35.673 | 197.021 | 51.042 | 0.910 | 30.427 |
| 18 | 3,660 | 6,300.0 | 38.352 | 210.444 | 53.229 | 0.570 | 30.627 |
| 19 | 3,875 | 6,650.0 | 42.300 | 225.249 | 54.803 | 0.340 | 30.746 |
| 20 | 4,079 | 7,000.0 | 23.970 | 233.638 | 59.227 | 0.170 | 30.805 |

TABLE X-B

COPPER RECYCLE TEST 9

| | IRON | | | | ALUMINUM | | |
|---|---|---|---|---|---|---|---|
| g/l Fe | Cum g Fe | Cu/Fe | Cum Cu/Fe | g/l Al | Cum g Al | Cu/Al | Cum Cu/Al |
| 2.520 | 1.071 | 5.000 | 5.000 | 1.442 | 0.613 | 8.738 | 8.738 |
| 3.510 | 2.036 | 5.328 | 5.155 | 5.459 | 2.114 | 3.426 | 4.966 |
| 4.000 | 3.436 | 2.950 | 4.257 | 4.223 | 3.592 | 2.794 | 4.072 |
| 3.320 | 4.598 | 1.991 | 3.684 | 2.090 | 4.674 | 2.139 | 3.625 |
| 3.270 | 5.743 | 1.535 | 3.256 | 2.781 | 5.647 | 1.805 | 3.311 |
| 3.230 | 6.873 | 1.260 | 2.928 | 2.678 | 6.584 | 1.520 | 3.056 |
| 3.170 | 7.983 | 1.079 | 2.671 | 2.678 | 7.522 | 1.277 | 2.834 |
| 3.410 | 9.176 | 0.953 | 2.447 | 2.678 | 8.459 | 1.214 | 2.655 |
| 3.520 | 10.408 | 0.903 | 2.265 | 2.575 | 9.360 | 1.235 | 2.513 |
| 3.460 | 11.619 | 0.847 | 2.117 | 2.575 | 10.261 | 1.138 | 2.397 |
| 3.420 | 12.816 | 0.822 | 1.996 | 2.369 | 11.091 | 1.186 | 2.306 |
| 3.550 | 14.108 | 0.808 | 1.887 | 2.575 | 12.028 | 1.115 | 2.214 |
| 3.620 | 15.325 | 0.773 | 1.790 | 2.575 | 12.893 | 1.087 | 2.133 |
| 3.310 | 16.658 | 0.724 | 1.713 | 2.781 | 13.866 | 0.992 | 2.053 |
| 3.880 | 18.016 | 0.698 | 1.636 | 2.678 | 14.804 | 1.012 | 1.991 |
| 2.770 | 18.986 | 0.650 | 1.536 | 1.854 | 15.453 | 0.971 | 1.943 |
| 2.030 | 19.696 | 0.448 | 1.545 | 1.236 | 15.885 | 0.736 | 1.915 |
| 1.820 | 20.333 | 0.313 | 1.506 | 1.133 | 16.282 | 0.503 | 1.881 |
| 1.620 | 20.900 | 0.210 | 1.471 | 1.030 | 16.642 | 0.330 | 1.847 |
| 0.880 | 21.208 | 0.193 | 1.453 | 0.412 | 16.786 | 0.413 | 1.835 |

We claim:

1. A process for static leaching copper mineral values from a source material selected from ore, scrap, and combinations thereof containing copper in the presence of at least one other metal selected from iron and aluminum and for producing a high copper concentration pregnant leach liquor comprising sizing said source material, placing said source material in a vessel, adding an aqueous acid leach solution containing an initial acid concentration of at least about 1 percent acid by weight to said source material and percolating said acid leach solution through said source material in a volume sufficient to cover said source material, adding a sweep solution to said source material to displace said acid leach solution, recovering an effluent pregnant leach liquor from said source material, and segregating about the first 10–30 volume percent of effluent pregnant leach liquor forming a concentrated pregnant leach liquor from the last 70–90 volume percent of effluent pregnant leach liquor and recycling said last 70–90 volume percent effluent pregnant leach liquor.

2. A process for static leaching copper mineral values from a source material comprising sizing said source material, contacting a first portion of said source material with an acid leach solution by adding said solution to said source material and percolating said acid leach solution through said source material, adding a sweep solution to said source material to displace said acid leach solution, recovering an effluent pregnant leach liquor from said source material, segregating the first portion of effluent pregnant leach liquor forming a first portion of concentrated pregnant leach liquor from the last portion of said effluent leach liquor forming a first portion of recycle leach liquor, contacting a second portion of said source material with said recycle acid leach solution by adding said recycle leach liquor to said source material and percolating said leach liquor through said source material, adding a sweep solution to said source material to displace said acid leach solution, recovering an effluent pregnant leach liquor from said source material, and segregating the first portion of effluent pregnant leach liquor forming a second portion of concentrated pregnant leach liquor from the last portion of said effluent leach liquor forming a second portion of recycle leach liquor.

3. A process for static leaching copper mineral values from a source material selected from ore, scrap, and combinations thereof containing copper in the presence of at least one other metal selected from iron and aluminum and for producing a high copper concentration pregnant leach liquor comprising sizing said source material, placing said source material in a vessel, adding an acid leach solution containing at least about 1 percent acid by weight to said source material and percolating said acid leach solution through said source material in a volume sufficient to cover said source material, adding a sweep solution to said source material to displace said acid leach solution, recovering an effluent pregnant leach liquor from said source material, segregating about the first 10–30 volume percent of effluent pregnant leach liquor forming a concentrated pregnant leach liquor from the last 70–90 volume percent of effluent pregnant leach liquor forming a recycle leach liquor, adjusting the acid concentration of said recycle leach liquor to an acid concentration approximately equal to said initial acid concentration, adding said recycle leach liquor to source material in a second vessel and percolating said acid leach solution through said source material in a volume sufficient to cover said source material, adding a sweep solution to said source material to displace said acid leach solution, recovering an effluent pregnant leach liquor from said source material, and segregating about the first 10–30 volume percent of effluent pregnant leach liquor forming a concentrated pregnant leach liquor from the last 70–90 volume percent of effluent pregnant leach liquor forming a recycle leach liquor.

4. The process of claim 3 wherein the source material is an oxide ore and the acid leach solution is sulfuric acid.

5. A process for static leaching copper mineral values from a source material comprising sizing said source material, contacting a portion of said source material with an acid leach solution by adding said solution to said source material and percolating said acid leach solution through said source material, adding a sweep solution to said source material to displace said acid leach solution, recovering an effluent pregnant leach liquor from said source material, segregating the first portion of effluent pregnant leach liquor forming a first portion of concentrated pregnant leach liquor from the last portion of said effluent leach liquor forming a first portion of recycle leach liquor, contacting of a portion of said source material with said recycle acid leach solution by adding said recycle leach liquor to said source material and percolating said leach liquor through said source material, adding a sweep solution to said source material to displace said acid leach solution, recovering an effluent pregnant leach liquor from said source material, and segregating the first portion of effluent pregnant leach liquor forming a second portion of concentrated pregnant leach liquor from the last portion of said effluent leach liquor forming a second portion of recycle leach liquor.

* * * * *